United States Patent
Hansel et al.

(10) Patent No.: US 8,026,314 B2
(45) Date of Patent: Sep. 27, 2011

(54) PLASTICIZER PREPARATIONS

(75) Inventors: Jan-Gerd Hansel, Bergisch-Gladbach (DE); Melanie Wiedemeier, Dormagen-Delhoven (DE)

(73) Assignee: LANXESS Deutschland GmbH, Leverkusen (DE)

( * ) Notice: Subject to any disclaimer, the term of this patent is extended or adjusted under 35 U.S.C. 154(b) by 87 days.

(21) Appl. No.: 12/500,348

(22) Filed: Jul. 9, 2009

(65) Prior Publication Data

US 2010/0093885 A1    Apr. 15, 2010

(30) Foreign Application Priority Data

Jul. 19, 2008   (DE) .......................... 10 2008 033 834

(51) Int. Cl.
*C08L 27/06* (2006.01)
*C08L 33/10* (2006.01)

(52) U.S. Cl. .......................... 525/227; 525/239; 525/302

(58) Field of Classification Search .................. 524/295; 514/227.2, 227.5, 227.8, 228.8, 235.5, 236.6, 514/236.8, 318, 326

See application file for complete search history.

(56) References Cited

U.S. PATENT DOCUMENTS

| | | | | | |
|---|---|---|---|---|---|
| 2,684,955 | A | * | 7/1954 | Knowles et al. | 524/158 |
| 3,617,400 | A | * | 11/1971 | Lampert | 149/2 |
| 3,770,670 | A | * | 11/1973 | Kuhlow et al. | 521/74 |
| 4,533,562 | A | * | 8/1985 | Ikegami et al. | 427/2.18 |
| 5,319,028 | A | * | 6/1994 | Nakamura et al. | 525/227 |
| 5,362,777 | A | * | 11/1994 | Tomka | 524/47 |
| 6,054,524 | A | * | 4/2000 | Breton et al. | 524/569 |
| 6,117,928 | A | * | 9/2000 | Hiltunen et al. | 524/284 |
| 6,392,011 | B1 | * | 5/2002 | Nakamura et al. | 528/502 R |
| 6,429,206 | B2 | * | 8/2002 | Dorn et al. | 514/226.8 |
| 7,071,252 | B2 | * | 7/2006 | Stanhope et al. | 524/292 |
| 2003/0060546 | A1 | * | 3/2003 | Moskala et al. | 524/284 |
| 2003/0181556 | A1 | * | 9/2003 | Lang et al. | 524/295 |
| 2004/0106812 | A1 | * | 6/2004 | Daute et al. | 549/562 |
| 2006/0276517 | A1 | * | 12/2006 | Dorn et al. | 514/357 |
| 2008/0108670 | A1 | * | 5/2008 | Dorn et al. | 514/341 |
| 2008/0108671 | A1 | * | 5/2008 | Dorn et al. | 514/341 |
| 2010/0093885 | A1 | * | 4/2010 | Hansel et al. | 523/100 |

FOREIGN PATENT DOCUMENTS

| | | |
|---|---|---|
| GB | 317443 | 11/1930 |
| GB | 1452402 | 10/1976 |
| JP | 2003064297 | 3/2003 |
| WO | WO 98/58887 | 12/1998 |

OTHER PUBLICATIONS

European Search Report from co-pending Application EP09165508 dated Nov. 25, 2010, 6 pages.

* cited by examiner

*Primary Examiner* — James J Seidleck
*Assistant Examiner* — Peter A Salamon
(74) *Attorney, Agent, or Firm* — Michael A. Miller

(57) ABSTRACT

The present invention relates to plasticizer preparations based on triacetin with short gel time, and to their use, and to polyvinyl chloride preparations.

12 Claims, No Drawings

PLASTICIZER PREPARATIONS

The present application claims priority from German Application Number 10 2008 033 834.6, filed Jul. 19, 2008.

The present invention relates to plasticizer preparations based on triacetin with short gel time, and to their use, and to polyvinyl chloride preparations.

BACKGROUND

The expression "plasticizer" is used in the technical chemical literature for substances capable, simple by virtue of their admixture, of converting a hard, brittle substance into a soft, extensible, tough or elastic preparation. The expression is used in very many different contexts. By way of example, it is often used in concrete processing (see for example WO 98 58 887 A1) and in rocket fuel production (see for example U.S. Pat. No. 3,617,400). The expression "plasticizer" is used in the narrower sense to mean materials added during polymer processing which can alter the mechanical properties of thermoplastic polymers in the abovementioned manner. Examples of polymers processed with plasticizers are polyvinyl chloride, polyvinyl butyral, polyamide and cellulose acetate. The largest quantitative use is in polyvinyl chloride.

The suitability of a substance as plasticizer for a particular polymer depends on the properties of the polymer. In the last 50 years, increasingly stringent technical and economic requirements placed upon production processes and on plasticized plastics have meant that the substances preferred as plasticizer differ as a function of the polymer. Substances having good suitability as plasticizer in a particular polymer here typically have low suitability or indeed no suitability in another polymer.

Triacetin (glycerol triacetate, Chemical Abstracts Registry Number 102-76-1) is described as plasticizer for cellulose acetate (see for example GB 317,443), starch (see for example WO 9005161 A1) and polylactide (see for example U.S. Pat. No. 6,117,928). However, triacetin is not known for use as plasticizer in polyvinyl chloride. The comparative examples presented below demonstrate that the solution temperature of triacetin in polyvinyl chloride is above 200° C. This confirms that triacetin has extremely poor compatibility with polyvinyl chloride.

In the context of plasticizers, the solution temperature is the temperature at which gelling produces a homogeneous phase from a polyvinyl chloride suspension in a plasticizer. A low solution temperature indicates that the plasticizer has good gelling power. This is often desirable, since it is then possible to process the material at low temperatures, saving energy. Substances with solution temperatures above 180° C. are unsuitable as plasticizers for polyvinyl chloride (L. Meier: "Weichmacher" [Plasticizers], in R. Gächter, H. Müller (Ed.): Taschenbuch der Kunststoffadditive [Plastics additives handbook], 3rd Edition, pp. 361-362, Hanser Verlag, Munich 1990).

When polyvinyl chloride is processed with plasticizers, there are other properties of the plasticizer that can play a decisive role, alongside a sufficiently low solution temperature. By way of example, an important factor in the production of polyvinyl chloride plastisols can be that the viscosity of the polyvinyl chloride suspension initially prepared in the plasticizer is low, enabling it to be processed easily. In many applications, the intention is that the subsequent gelling of the suspension on exposure to heat should proceed at maximum rate, in order to limit the amount of time and energy required. An example of a plasticizer used in such instances in the prior art is benzyl butyl phthalate.

The intended function of the plasticizer in the fully gelled, plasticized polyvinyl chloride preparation is not only to provide the desired softness but also by way of example to have maximum resistance to migration into adjacent media.

Further demands placed upon plasticizers result from the desire to avoid hazards to humans and the environment. By way of example, under European Union Directive 2005/84/EC it is no longer permissible to use the plasticizers di(2-ethylhexyl)phthalate, dibutyl phthalate and benzyl butyl phthalate in toys or baby items, or to use the plasticizers diisononyl phthalate, diisodecyl phthalate and di-n-octyl phthalate in toys or baby items which might enter children's mouths. There is therefore a particular requirement for suitable replacement materials for the abovementioned plasticizers di(2-ethylhexyl) phthalate, dibutyl phthalate and benzyl butyl phthalate.

In view of these restrictions, which to many consumers can appear to be confusing and worrying, many producers are actually adopting a generalized approach of avoiding all phthalate-containing plasticizers in the production of plasticized polyvinyl chloride. The result of this is a requirement for phthalate-free plasticizers which in terms of processability and service properties achieve the performance level of phthalate-containing plasticizers.

In relation to the abovementioned fast gelling, there is a requirement for a replacement material for benzyl butyl phthalate, in particular a requirement for a phthalate-free replacement material for benzyl butyl phthalate, or for a replacement material which is better than previous phthalate-free plasticizers in PVC but whose performance level is comparable with that of phthalate-containing plasticizers.

It was an object of the present invention to provide a plasticizer with low solution temperature and short gel time which is a suitable replacement material for di(2-ethylhexyl) phthalate, and for dibutyl phthalate, and in particular for benzyl butyl phthalate. The preparations according to the invention achieve this object.

SUMMARY OF THE INVENTION

The invention provides a preparation, comprising
a) from 5 to 50% by weight of triacetin and
b) from 50 to 95% by weight of one or more plasticizers whose solution temperature in polyvinyl chloride is below 180° C.

For clarification, it may be noted that the scope of the invention encompasses, in any desired combinations, all of the definitions and parameters mentioned in general terms or in preferred ranges below. Triacetin, also known as glycerol triacetate (CAS number 102-76-1), is a colourless liquid having an oily to rancid odour. It is soluble in alcohols and ethers, and is synthesized in glycerol and acetic acid.

In one preferred embodiment of the invention, the preparation comprises
a) from 5 to 30% by weight of triacetin and
b) from 70 to 95% by weight of one or more plasticizers whose solution temperature in polyvinyl chloride is below 180° C.

Plasticizers whose solution temperature in polyvinyl chloride is below 180° C. are substances or substance mixtures such as those described by way of example in L. Meier: "Weichmacher" [Plasticizers], in R. Gächter, H. Müller (Ed.): Taschenbuch der Kunststoffadditive [Plastics additives handbook], 3rd Edition, pp. 383-425, Hanser Verlag, Munich 1990. The entire content of the said reference is incorporated into the present invention in relation to the plasticizers to be used according to the invention as component b).

In one preferred embodiment of the invention, the plasticizers present in the preparation involve phthalate-free plasticizers.

In the context of the present invention, the expression "phthalate-free plasticizers" means a substance or a substance mixture which comprises less than 1.0% by weight of dialkyl phthalate and whose solution temperature in polyvinyl chloride is below 180° C.

In one particularly preferred embodiment of the invention, the preparation is characterized in that it comprises less than 0.1% by weight of dialkyl phthalate.

These and other features, aspects, and advantages of the present invention will become better understood with reference to the following description and appended claims.

DESCRIPTION

The plasticizers to be used as component b) in the preparation are known to the person skilled in the art. The phthalate-free plasticizers particularly preferably involve plasticizers from the series of alkyl esters of benzoic acid, dialkyl esters of aliphatic dicarboxylic acids, polyesters of aliphatic dicarboxylic acids or of aliphatic di-, tri- and tetrols, the end groups of which are unesterified or have been esterified with monofunctional reagents, preferably with monoalcohols or monocarboxylic acids, and the number-average molar mass of which is from 1000 to 20 000 g/mol, trialkyl esters of citric acid, acetylated trialkyl esters of citric acid, glycerol esters, benzoic diesters of mono-, di-, tri- or polyalkylene glycols, trimethylolpropane esters, dialkyl esters of cyclohexanedicarboxylic acids, dialkyl esters of terephthalic acid, trialkyl esters of trimellitic acid, triaryl esters of phosphoric acid, diaryl alkyl esters of phosphoric acid, trialkyl esters of phosphoric acid or aryl esters of alkanesulphonic acids. Other phthalate-free plasticizers are equally suitable.

Isononyl benzoate is a particularly preferred alkyl ester of benzoic acid. Di-2-ethylhexyl adipate is a particularly preferred dialkyl ester of aliphatic dicarboxylic acids.

Particularly preferred polyesters of aliphatic dicarboxylic acids or of aliphatic di-, tri- and tetrols, the end groups of which have been esterified with monofunctional reagents, and the number-average molar mass of which is from 1000-20 000 g/mol are adipic polyesters, particularly the product Ultramoll® IV from Lanxess Deutschland GmbH.

Tributyl citrate is a particularly preferred trialkyl ester of citric acid.

Tributyl acetylcitrate is a particularly preferred acetylated trialkyl ester of citric acid.

Acetylated mono- and diglycerides are particularly preferred glycerol esters.

Dipropylene glycol dibenzoate is a particularly preferred benzoic diester of dialkylene glycols.

Trimethylolpropane benzoate 2-ethylhexanoate mixtures are particularly preferred trimethylolpropane esters.

Diisononyl 1,2-cyclohexanedicarboxylate is a particularly preferred dialkyl ester of cyclo-hexanedicarboxylic acids.

Di-2-ethylhexyl terephthalate is a particularly preferred dialkyl ester of terephthalic acid.

Tri-2-isononyl trimellitate is a particularly preferred trialkyl ester of trimellitic acid.

Diphenyl cresyl phosphate is a particularly preferred diaryl alkyl ester of phosphoric acid.

Tri-2-ethylhexyl phosphate is a particularly preferred trialkyl ester of phosphoric acid.

Phenyl esters of alkanesulphonic acids are particularly preferred aryl esters of alkanesulphonic acids.

The plasticizers present in the preparation particularly preferably involve phenyl esters of alkanesulphonic acids, e.g. the product Mesamoll® from Lanxess Deutschland GmbH.

The preparations according to the invention can also comprise components which are known and have good commercial availability, and can be produced by single mixing. In processing with polyvinyl chloride, they feature unexpectedly short gel times and advantageous migration properties.

The invention further provides the use of triacetin in the production of plasticized polyvinyl chloride, characterized in that 1. the triacetin is used in combination with one or more plasticizers, and
2. the preparation/entirety composed of triacetin and plasticizer and used for the production of plasticized polyvinyl chloride comprises
   a) from 5 to 50% by weight of triacetin and
   b) from 50 to 95% by weight of one or more plasticizers whose solution temperature in polyvinyl chloride is below 180° C.

One preferred embodiment of the invention provides the use of triacetin in the production of plasticized polyvinyl chloride, characterized in that 1. the triacetin is used in combination with one or more plasticizers, and
2. the preparation/entirety composed of triacetin and plasticizer for the production of plasticized polyvinyl chloride comprises
   a) from 5 to 30% by weight of triacetin and
   b) from 70 to 95% by weight of one or more plasticizers whose solution temperature in polyvinyl chloride is below 180° C.

The % data are based on the weight of the entirety composed of triacetin and plasticizer. The plasticizers preferably involve phthalate-free plasticizers.

Processes for the production of plasticized polyvinyl chloride are known, for example from L. Meier: "Weichmacher" [Plasticizers], in R. Gächter, H. Müller (Ed.): Taschenbuch der Kunststoffadditive [Plastics additives handbook], 3rd Edition, pp. 350-357, Hanser Verlag, Munich 1990. Triacetin and plasticizers can be used in the said processes in the form of a preparation previously prepared, or else independently of one another in any desired manner. The phthalate-free plasticizers used preferably comprise the substances listed above. The phthalate-free plasticizers used preferably comprise the phenyl esters of alkanesulphonic acids, an example being the product Mesamoll® from Lanxess Deutschland GmbH.

Finally, the invention provides a polyvinyl chloride preparation comprising polyvinyl chloride, triacetin and plasticizer, and also, if appropriate, further additives, characterized in that 1. the polyvinyl chloride preparation comprises, based on 100 parts by weight of polyvinyl chloride,
   a) from 0.5 to 50 parts by weight of triacetin and
   b) from 5 to 95 parts by weight of one or more plasticizers whose solution temperature in polyvinyl chloride is below 180° C., and
2. the entirety composed of triacetin and plasticizer makes up an amount of from 10 to 100 parts by weight per 100 parts by weight of polyvinyl chloride.

In one preferred embodiment of the invention, the polyvinyl chloride preparation comprises, based on 100 parts by weight of polyvinyl chloride, a) from 0.5 to 30 parts by weight of triacetin and
b) from 7 to 95 parts by weight of one or more plasticizers whose solution temperature in polyvinyl chloride is below 180° C., where the entirety composed of triacetin and plasticizer again makes up an amount of from 10 to 100 parts by weight per 100 parts by weight of polyvinyl chloride.

It is preferable that the polyvinyl chloride preparation comprises, as plasticizer, phthalate-free plasticizer. In one particularly preferred embodiment of the invention, the polyvinyl chloride preparation is characterized in that it comprises less than 0.1% by weight of dialkyl phthalate.

However, the present invention also provides a process for the production of plasticized polyvinyl chloride, characterized in that triacetin is used, preferably in combination with one or more plasticizers whose solution temperature in polyvinyl chloride is below 180° C.

The polyvinyl chloride present in the polyvinyl chloride preparation of the invention is preferably produced via homopolymerization from vinyl chloride by methods known to the person skilled in the art, e.g. suspension polymerization, emulsion polymerization or bulk polymerization. The phthalate-free plasticizers used comprise the abovementioned substances.

In one preferred embodiment, the present invention provides a polyvinyl chloride preparation characterized in that one or more additives are used, selected from the group of PVC-stabilizers, light stabilizers, biostabilizers, lubricants, fillers, pigments, flame retardants, blowing agents, polymeric processing aids, impact modifiers, optical brighteners and antistatic agents.

The said additives can be present in any desired combination. Some suitable additives are described in more detail below. However, the examples listed do not represent any restriction of the polyvinyl chloride preparation according to the invention, but serve merely for illustration. All of the % data are based on the weight of the entire polyvinyl chloride preparation.

PVC-stabilizers neutralize the hydrochloric acid eliminated during and/or after the processing of the polyvinyl chloride. The PVC-stabilizers used can comprise any of the conventional polyvinyl chloride stabilizers in solid or liquid form, examples being epoxy/zinc stabilizers, Ca/Zn stabilizers, Ba/Zn stabilizers, Pb stabilizers or Sn stabilizers, and also metal-free stabilizers, and also acid-binding phyllosilicates, such as hydrotalcite. Polyvinyl chloride preparations according to the invention can preferably comprise from 0 to 7%, with preference from 0.1 to 5%, with particular preference from 0.2 to 4% and particularly from 0.5 to 3%, of stabilizers.

In one preferred embodiment, lubricants are intended to be effective between the polyvinyl chloride particles and to counteract frictional forces during mixing, plastification and deformation processes. Lubricants which can be used for the polyvinyl chloride preparation according to the invention comprise any of the conventional lubricants for the processing of plastics, preferably hydrocarbons, and particularly preferably oils, paraffins and PE waxes, fatty alcohols having from 6 to 20 carbon atoms, ketones, carboxylic acids, preferably fatty acids or montanic acids, oxidized PE wax, metal salts of carboxylic acids, carboxamides, and also carboxylic esters, preferably with the alcohols ethanol, or with fatty alcohols, with glycerol, with ethanediol, or with pentaerythritol, or with long-chain carboxylic acids, as acid component. The polyvinyl chloride preparation according to the invention preferably comprises from 0 to 10%, with preference from 0.05 to 5%, with particular preference from 0.1 to 3%, and particularly from 0.2 to 2%, of lubricant.

In one preferred embodiment, fillers have a favourable effect particularly on the compressive, tensile and flexural strength of plasticized polyvinyl chloride, and also on its hardness and heat resistance. The polyvinyl chloride preparation according to the invention can comprise, as fillers, carbon black, natural calcium carbonates, e.g. chalk, limestone and marble, synthetic calcium carbonates, dolomite, silicates, silica, sand, diatomaceous earth, aluminium silicates, such as kaolin, mica and feldspar, and other inorganic fillers and organic fillers, examples being wood flour, wood shavings, or wood fibres. Fillers used with preference are calcium carbonates, chalk, dolomite, kaolin, silicates, talc or carbon black. The polyvinyl chloride preparation according to the invention preferably comprises from 0 to 80% of fillers, with preference from 0.1 to 60%, with particular preference from 0.5 to 50% and particularly from 1 to 40%.

The polyvinyl chloride preparation according to the invention can also comprise pigments, in order to match a colour of the resultant product to various possible applications. Inorganic pigments or else organic pigments can be used for this purpose. Examples of inorganic pigments that can be used are cadmium pigments, such as CdS, cobalt pigments, such as $CoO/Al_2O_3$, and chromium pigments, such as $Cr_2O_3$. Examples of organic pigments that can be used are monoazo pigments, condensed azo pigments, azomethine pigments, anthraquinone pigments, quinacridones, phthalocyanine pigments, dioxazine pigments and aniline pigments. The polyvinyl chloride preparation according to the invention preferably comprises from 0 to 10% of pigments, with preference from 0.05 to 5%, with particular preference from 0.1 to 3% and particularly from 0.5 to 2%.

In order to reduce flammability and to reduce smoke generation during combustion, the polyvinyl chloride preparation according to the invention can also comprise flame retardants. Flame retardants preferably used are antimony trioxide, phosphoric esters, chloroparaffin, aluminium hydroxide, boron compounds, zinc compounds, molybdenum trioxide, ferrocene, calcium carbonate or magnesium carbonate. The polyvinyl chloride preparation according to the invention preferably comprises from 0 to 30% of flame retardant, with preference from 0.1 to 25%, with particular preference from 0.2 to 20% and particularly from 0.5 to 15%.

In order to protect items produced from the polyvinyl chloride preparation according to the invention from damage due to the effect of light, light stabilizers can be added. For this, it is preferable to use hydroxybenzophenones or hydroxyphenylbenzotriazoles. The polyvinyl chloride preparation according to the invention preferably comprises from 0 to 7% of light stabilizers, with preference from 0.1 to 5%, with particular preference from 0.2 to 4% and particularly from 0.5 to 3%.

The polyvinyl chloride preparation according to the invention can be used for the production of foams, using blowing agents. To this end, chemical or physical blowing agents are added to the preparation. Chemical blowing agents that can be used comprise any of the substances known for this purpose, preferably azodicarbonamide, p-toluenesulphonyl hydrazide, 4,4'-oxybis(benzenesulphohydrazide), p-toluenesulphonylsemicarbazide, 5-phenyltetrazole, N,N'-dinitrosopentamethylenetetramine, zinc carbonate or sodium hydrogencarbonate, and also mixtures comprising the said substances. Physical blowing agents of preferred suitability are carbon dioxide or halogenated hydrocarbons. The polyvinyl chloride preparation according to the invention preferably comprises from 0 to 20%, with preference from 0.05 to 15%, with particular preference from 0.1 to 10%, and particularly from 0.7 to 3%, of blowing agent.

The polyvinyl chloride preparation can also comprise further plastics which act by way of example as polymeric processing aids or impact modifiers. These further plastics are selected from the series of the homo- and copolymers based on ethylene, propylene, butadiene, vinyl acetate, glycidyl acrylate, glycidyl methacrylate, acrylates and methacrylates with alcohol components of branched or unbranched $C_1$-$C_{10}$ alcohols, styrene or acrylonitrile. Particular preference is given to polyacrylates having identical or different alcohol moieties from the group of the $C_4$-$C_8$ alcohols, in particular of butanol, hexanol, octanol and 2-ethylhexanol, polymethyl methacrylate, methyl methacrylate-butyl acrylate copolymers, methyl methacrylate-butyl methacrylate copolymers, ethylene-vinyl acetate copolymers, chlorinated polyethylene, nitrile rubber, acrylonitrile-butadiene-styrene copolymers, ethylene-propylene copolymers, ethylene-propylene-diene copolymers, styrene-acrylonitrile copolymers, acrylonitrile-butadiene rubber, styrene-butadiene elastomers and methyl methacrylate-styrene-butadiene copolymers.

The polyvinyl chloride preparation according to the invention is produced and further processed according to the known processes for the production of plasticized polyvinyl chloride. It is used for the production of pipelines, of cables, of wire sheathing, in internal fittings, or in the construction of vehicles or of furniture, in floor coverings, in medical items, in food-or-drink packing, in gaskets, in tarpaulins, in foils, including composite foils and foils for laminated safety glass, particularly for the vehicle sector and for the architecture sector, or in synthetic leather, toys, packaging containers, adhesive-tape foils, apparel, coatings, or else fibres for textiles.

Finally, the present invention also provides acceleration of the gelling of polyvinyl chloride plastisols via use of triacetin in combination with one or more plasticizers whose solution temperature in polyvinyl chloride is below 180° C. It is preferable here that the triacetin and the plasticizer are used as preparation in the abovementioned amounts in % by weight.

The examples below provide further explanation of the invention, but there is no intention that the invention be restricted thereby.

Substances Used:

Vinnolit® H 70 DF, Vinnolit GmbH & Co. KG, Ismaning, Germany (suspension polyvinyl chloride, K value 70, >95% sieve residue on sieve with mesh width 0.063 mm).

Vestolit® B 7021, Vestolit GmbH & Co. KG, Marl, Germany (suspension polyvinyl chloride, K value 70, <1% sieve residue on sieve with mesh width 0.063 mm).

Triacetin, Lanxess Deutschland GmbH, Leverkusen, Germany (glycerol triacetate).

Mesamoll®, Lanxess Deutschland GmbH, Leverkusen, Germany (phenyl ester of alkanesulphonic acids).

Unimoll® BB, Lanxess Deutschland GmbH, Leverkusen, Germany (benzyl butyl phthalate).

Ultramoll® IV, Lanxess Deutschland GmbH, Leverkusen, Germany (adipic polyester).

Adimoll® DO, Lanxess Deutschland GmbH, Leverkusen, Germany (di-2-ethylhexyl adipate).

Irgastab® CZ 11, Ciba Specialty Chemicals, Basle, Switherland (stabilizer based on calcium zinc carboxylates).

Solution Temperature

The substance to be tested (48.0 g) was weighed into a glass beaker with magnetic stirrer bar and thermometer. The glass beaker was placed in a holder on a heated magnetic stirrer between a lamp and a photocell. Changes in the light transmittance of the specimen were recorded by way of the photocell. Polyvinyl chloride (2.0 g) (Vinnolit® H 70 DF) was then added. The polyvinyl chloride was mixed into the plasticizer and heated at from 5 to 8° C. per min, with stirring. At 30° C. below the expected solution temperature, the heating rate was reduced to from 2 to 3° C. per min. The solution temperature was considered to have been reached when a period of 3 minutes passed without any kind of rise in the photocell indicator, and the polyvinyl chloride had been dissolved. The determination was carried out up to a maximum of 200° C., and was terminated at that point if solution had not been achieved, the solution temperature then being noted as not determinable. Double determinations were carried out in each case, and were repeated if the deviation was more than 2° C.

Table 1 lists the results of the said test.

TABLE 1

Constitution (% by weight) and solution temperatures of Inventive Examples IE 1 to IE 6 and of Comparative Examples CE 1 to CE 3.

| | Example | | | | | | | |
|---|---|---|---|---|---|---|---|---|
| | CE 1 | IE 1 | IE 2 | IE 3 | IE 4 | IE 5 | IE 6 | CE 2 |
| Triacetin | 100% | 25% | 20% | 15% | 10% | 7.5% | 5% | 0% |
| Mesamoll ® | 0% | 75% | 80% | 85% | 90% | 92.5% | 95% | 100% |
| Unimoll ® BB | 0% | 0% | 0% | 0% | 0% | 0% | 0% | 0% |
| Solution temperature [° C.] | >200 | 120 | 117 | 119 | 119 | 119 | 122 | 119 |

It will be understood that the specification and examples are illustrative but not limitative of the present invention and that other embodiments within the spirit and scope of the invention will suggest themselves to those skilled in the art.

EXAMPLES

Unless otherwise stated, all of the parts and percentage data are based on weight. The comparative examples given are not according to the invention.

Evaluation of Solution Temperature

Triacetin has a solution temperature above 200° C. and is therefore unsuitable as plasticizer for polyvinyl chloride (Comparative Example CE 1). In contrast, mixtures of triacetin and Mesamoll® (Inventive Examples IE 1 to IE 6) have very low solution temperatures, differing little from the solution temperature of pure Mesamoll®: 119° C. (Comparative Example CE 2). This shows that the phthalate-free mixtures according to the invention of Inventive Examples IE 1 to IE 6 have surprisingly good compatibility with polyvinyl chloride.

The said good compatibility was not expected, since triacetin itself is unsuitable as plasticizer for polyvinyl chloride.

Viscosity

Polyvinyl chloride (Vestolit® B 7021) and plasticizer, in the quantitative proportions stated in Table 2, were weighed into an (aluminium) measuring beaker, mixed at 20° C. for 5 min in Mathis LPE paste evacuation equipment (Mathis, Switzerland), and stored at 20° C. for 24 h. The temperature of the resultant suspension was controlled to 20° C. via means of a thermostatic oil bath. The viscosity of the suspension was then determined using a rheometer (Rheolab MC 120, Anton Paar Germany GmbH, Ostfildern). Table 2 lists the results of the said test.

TABLE 2

Constitution (parts) and viscosities of Inventive Examples IE 7 and IE 8 and of Comparative Examples CE 4 and CE 5.

| | Example | | | |
|---|---|---|---|---|
| | CE 4 | CE 5 | IE 7 | IE 8 |
| Vestolit ® B 7021 | 100 | 100 | 100 | 100 |
| Triacetin | 0 | 0 | 10 | 20 |
| Mesamoll ® | 0 | 80 | 70 | 60 |
| Unimoll ® BB | 80 | 0 | 0 | 0 |
| Viscosity [mPas] | 1800 | 2670 | 2040 | 1520 |

Evaluation of Viscosity

The viscosity of a polyvinyl chloride suspension in a plasticizer is an important variable in the processing of polyvinyl chloride. Low viscosities are often required for easy processing. The polyvinyl chloride suspension with the phthalate-based plasticizer Unimoll® BB (Comparative Example CE 4) exhibits markedly lower viscosity than the corresponding suspension with the phthalate-free plasticizer Mesamoll® (Comparative Example CE 5). This obvious technical disadvantage of Mesamoll® with respect to Unimoll® BB can be eliminated if the Mesamoll® is mixed with triacetin. The viscosities of the mixtures in Examples IE 7 and IE 8 are markedly below the viscosity of the Mesamoll® suspension and indeed, in the case of IE 8, below that of the Unimoll® BB suspension.

Gel Time

Polyvinyl chloride suspensions were prepared as described above for the measurement of viscosity. The said suspensions were gelled at 70° C. in the rheometer described. The time required here for gelling to achieve a viscosity of 500 000 mPas was determined. Table 3 lists the results of the said test.

TABLE 3

Constitution (parts) and gel times of Inventive Example IE 7 and IE 8 and Comparative Examples CE 4 and CE 5.

| | Example | | |
|---|---|---|---|
| | CE 4 | CE 5 | IE 7 |
| Vestolit ® B 7021 | 100 | 100 | 100 |
| Triacetin | 0 | 0 | 20 |
| Mesamoll ® | 0 | 80 | 60 |
| Unimoll ® BB | 80 | 0 | 0 |
| Gel time [min] | 1.6 | 7.0 | 3.8 |

Evaluation of Gel Time

The gel time of a plasticizer is a decisive variable for an operation which is acceptable in technical and economic terms. The phthalate-based plasticizer Unimoll® BB (Comparative Example CE 4), known to the person skilled in the art as a fast-geller, gels markedly more rapidly than the phthalate-free plasticizer Mesamoll® (Comparative Example CE 5). This serious technical disadvantage of Mesamoll® with respect to Unimoll® BB can be reduced markedly if the Mesamoll® is mixed with triacetin (Inventive Example IE 7).

Plasticizing Effect

To determine the plasticizing effect of plasticizer mixtures, roll-milled sheets composed of compounded polyvinyl chloride materials of the constitution stated in Table 4 were produced at a thickness of 6 mm. The roll-milled sheets were cut to give test specimens of diameter 35 mm, the Shore hardness of which was determined by means of a digital Shore hardness tester (Zwick GmbH & Co. KG, Ulm). The results of the said test are listed in Table 4 (in each case using five measurements to give average values).

TABLE 4

Constitution (parts) and Shore hardnesses of Inventive Examples IE 8 to IE 10 and of Comparative Examples CE 6 to CE 8.

| | Example | | | | | |
|---|---|---|---|---|---|---|
| | CE 6 | CE 7 | CE 8 | IE 9 | IE 10 | IE 11 |
| Vestolit ® B 7021 | 100 | 100 | 100 | 100 | 100 | 100 |
| Triacetin | 0 | 0 | 0 | 10 | 20 | 20 |
| Mesamoll ® | 0 | 80 | 0 | 70 | 60 | 0 |
| Unimoll ® BB | 80 | 0 | 0 | 0 | 0 | 0 |
| Ultramoll ® IV | 0 | 0 | 40 | 0 | 0 | 40 |
| Adimoll ® DO | 0 | 0 | 20 | 0 | 0 | 0 |
| Irgastab ® CZ 11 | 4 | 4 | 3 | 4 | 4 | 3 |
| Shore A | 55 | 55 | 65 | 54 | 59 | 66 |
| Shore D | 14 | 14 | 18 | 13 | 13 | 20 |

Evaluation of Plasticizing Effect

The plasticizing effect obtained by using identical amounts of various plasticizers can be compared using hardness measurements. As shown in the test results in Table 4, the plasticizer preparations according to the invention can be used to produce compounded polyvinyl chloride materials whose hardness levels correspond to those of the prior art. Surprisingly, the plasticizing properties of Mesamoll® plasticizer (Comparative Example CE 7) are not substantially altered (Inventive Examples IE 9 and IE 10) via admixture of the non-plasticizer triacetin. Comparative Example CE 8 is the type of formulation used for the production of food-and-drink foils. When comparison is made with this, Inventive Example IE 11 shows that replacement of Adimoll® DO plasticizer from the said formulation by the non-plasticizer triacetin is attended by only minimal losses of softness: this would not have been foreseeable from the known properties of triacetin.

Overall Evaluation

Triacetin alone is not a suitable plasticizer for use in polyvinyl chloride. Surprisingly, however, good plasticizing properties have been found for preparations composed of triacetin and preferably of phthalate-free plasticizers. Furthermore, the said preparations according to the invention exhibit unexpectedly advantageous processing properties, for example low viscosity of the polyvinyl chloride suspension, and short gel time.

What is claimed is:
1. A composition, comprising
a) from 5 to 50% by weight of triacetin and
b) 50 to 95% by weight of one or more plasticizers selected from the group consisting of phenylesters of alkanesulphonic acids.

2. The composition according to claim 1, comprising
  a) from 5 to 30% by weight of triacetin and
  b) from 70 to 95% by weight of the one or more plasticizers.

3. A polyvinyl chloride composition comprising polyvinyl chloride, triacetin and plasticizer, wherein the polyvinyl chloride composition comprises,
  a) from 0.5 to 50 parts by weight of triacetin and
    from 5 to 95 parts by weight of one or more plasticizers with respect to 100 parts by weight of polyvinylchloride and the entire composition of triacetin and plasticizer makes up an amount of from 10 to 100 parts by weight per 100 parts by weight polyvinylchloride, and phthalate-free plasticizers selected from the group consisting of series of alkyl esters of benzoic acid, dialkyl esters of aliphatic dicarboxylic acids, polyesters of aliphatic dicarboxylic acids or of aliphatic di-, tri- and tetrols, the end groups of which are unesterified or have been esterified with monofunctional reagents, and the number-average molar mass of which is from 1000 to 20,000 g/mol, trialkyl esters of citric acid, acetylated trialkyl esters of citric acid, glycerol esters, benzoic diesters of mono-, di-, tri-, or polyalkylene glycols, trimethylolpropane esters, dialkyl esters of cyclohexanedicarboxylic acids, dialkyl esters of terephthalic acid, trialkyl esters of trimellitic acid, triaryl esters of phosphoric acid, diaryl alkyl esters of phosphoric acid, trialkyl esters of phosphoric acid, and aryl esters of alkanesulphonic acids.

4. A method of using triacetin for accelerating the gelling of polyvinyl chloride plastisols, wherein the triacetin is used in combination with one or more plasticizers, and the entirety composed of triacetin and plasticizer comprises
  a) from 5 to 50% by weight of triacetin and
  b) from 50 to 95% by weight of one or more plasticizers selected from the group consisting of plasticizers from the series of alkyl esters of benzoic acid, dialkyl esters of aliphatic dicarboxylic acids, polyesters of aliphatic dicarboxylic acids or of aliphatic di-, tri- and tetrols, the end groups of which are unesterified or have been esterified with monfunctional reagents, and the number-average molar mass of which if from 100 to 20,000 g/mol, trialkyl esters of citric acid, acetylated trialkyl esters of citric acid, glycerol esters, benzoic diesters of mono-, di-, tri- or polyalkylene glycols, trimethylolpropane esters, dialkyl esters of cyclohexanedicarboxylic acids, dialkyl esters of terephthalic acid, trialkyl esters of trimellitic acid, triaryl esters of phosphoric acid, diaryl esters of phosphoric acid, trialkyl esters of phosphoric acid, and aryl esters of alkanesulphonic acids.

5. A method of use according to claim 4, wherein the sum of the triacetin and plasticizer comprises:
  a) 5-30% by weight triacetin, and
  b) 70-95% by weight of the one or more placticizers.

6. A method of use according to claim 4, wherein the plasticizers are arylesters of alkanesulphonic acids.

7. The polyvinylchloride composition according to claim 3, comprising less than 0.1% by weight of dialkyl phthalate.

8. A polyvinyl chloride composition according to claim 3, wherein the composition comprises:
  a) 0.5 to 30 parts by weight triacetin, and
  b) 5 to 95 parts by weight of the one or more plasticizers with respect to 100 parts by weight of polyvinylchloride.

9. A polyvinyl chloride preparation according to claim 3, wherein the phthalate-free plasticizer is an ester of alkanesulphonic acids.

10. The polyvinylchloride composition according to claim 3 further comprising one or more additives selected from the group consisting of PVC-stabilizers, light stabilizers, biostabilizers, lubricants, fillers, pigments, flame retardants, blowing agents, polymeric processing aids, impact modifiers, optical brightners, and antistatic agents.

11. A method of using triacetin in the production of plasticized polyvinyl chloride, wherein the triacetin is used in combination with one or more plasticizers, and the entirety composed of triacetin and plasticizer comprises:
  c) from 5 to 50% by weight of triacetin and
  d) from 50 to 95% by weight of one or more phthalate-free plasticizers comprising an arylester of alkanesulphonic acids whose solution temperature in polyvinyl chloride is below 180° C.

12. A polyvinyl chloride preparation comprising polyvinyl chloride, triacetin and plasticizer, wherein the polyvinyl chloride preparation comprises, based on 100 parts by weight of polyvinyl chloride,
  a) from 0.5 to 50 parts by weight of triacetin and
  b) from 5 to 95 parts by weight of one or more phthalate-free plasticizers comprising an ester of alkanesulphonic acids whose solution temperature in polyvinyl chloride is below 180° C., and the entirety composed of triacetin and plasticizer makes up an amount of from 10 to 100 parts by weight per 100 parts by weight of polyvinyl chloride.

\* \* \* \* \*